Patented June 10, 1952

2,599,587

UNITED STATES PATENT OFFICE 2,599,587

PROCESS OF PREPARING AN ANTIBACTERIAL SUBSTANCE FROM PYRIDOXAMINE

Gregory Shwartzman, New York, N. Y., assignor to Mount Sinai Hospital Research Foundation, Inc., New York, N. Y., a corporation of New York No Drawing. Application January 18, 1947, Serial No. 722,966

5 Claims. (Cl. 204—158)

The present invention relates to the preparation of a new antibacterial substance characterized by its antibiotic action on various gram negative as well as some gram positive organisms and to a process of preparing the same. More particularly the invention relates to the production of a new chemical compound characterized by the indicated antibacterial properties by subjecting pyridoxamine to an appropriate treatment including irradiation with ultraviolet light.

The invention is based on my observation that pyridoxamine when exposed in an acid solution to the action of light in the ultraviolet wave length range undergoes a transformation to a substance characterized by marked antibacterial action. The potency of the new antibacterial agent appears to be critically related to the wave length and duration of the irradiation as well as to the hydrogen ion concentration of the solution in which the pyridoxamine is suspended or dissolved. The temperature at which the irradiation is carried out and the concentration of the solution are also factors that need to be taken into consideration in obtaining a product of a predetermined potency. The influence of these several factors on the antibacterial potency of the product will be illustrated in the following description.

1. Detection and evaluation of antibacterial activity

The antibacterial activity of irradiated pyridoxamine was detected and titrated as follows:

The tests were made in Gladstone basal medium. The composition, use of the medium for bacteriostatic studies and turbidity measurements of growth have been previously described in detail (Shwartzman, G., J. Exp. Med., 83; 65 (1946). Stock cultures of the test organism, E. coli, strain 42 (ibid.) were maintained by transplanting in the basal medium twice a week. Five-hour-old cultures in the same medium suitably diluted in saline served for inoculation. For testing, serial dilutions of irradiated pyridoxamine (termed below "R-Pm") were added to the basal medium. The inoculum was added in the volume of one ml., the total volume in each tube being 8 cc. Unless stated otherwise, the final concentration of organisms at zero hours was $0.75 \times 10^6$ cells per ml. The minimal concentration of the substance giving complete inhibition of growth following incubation at 37.5° C. for twenty-four hours was considered as one R-Pm unit.

2. Relation of irradiation to antibacterial activity of pyridoxamine a. *Absence of antibacterial activity in non-irradiated solutions of pyridoxamine.*—Concentrated water solutions of pyridoxamine sterilized by autoclaving in a brown bottle and stored in a dark place were diluted in veronal buffer of pH ranging from 2.1 to 8.5 and tested for antibacterial activity in final concentrations of 10–250 $\gamma$ per ml. No antibacterial effect was detected in numerous tests with these solutions. The solutions of pH below 7.0 became, however, irregularly bacteriostatic on exposure to sunlight for a period of two hours or longer.

b. *Effectiveness of controlled irradiation.*—With a view to determining the optimum conditions of irradiation and the comparative results of irradiation with light of different wave lengths, a series of tests were carried on, using as the light source a mercury vapor quartz lamp of 85 watts. Ultraviolet radiation below 320 m$\mu$ was made available by removing the hard glass envelope. In these tests, separate quantities of solution of the concentrations, pH values and compositions indicated in further detail in the appended Table I and elsewhere hereinafter, were irradiated using the light filters hereinafter designated:

Filter 4441—This filter is 2 mm. thick and allows transmission in the visible region 380–640 m$\mu$ with maximum transparency at 480–500 m$\mu$.

Filter 9863—This filter is 3 mm. thick and transmits ultraviolet light between 230–410 m$\mu$, while absorbing all the visible light except for a trace of red and violet.

Filter 5860—This filter is 5 mm. thick and transmits light in the region between 330–390 m$\mu$ with the maximum transmission at 360 m$\mu$ but no visible light.

Filter 5970 is 5 mm. thick and transmits freely at 300–500 m$\mu$ and 680–720 m$\mu$, but little in the remaining portion of the visible region.

Pyrex tubes and optical cells of dimensions and transmission characteristics described in the footnote of Table I were used as container.

The distance between the lamp and the level of the fluid in the Pyrex tubes was 100 mm., while the height of the fluid column was 10 mm. The light was directed vertically through the filter into the open mouth of the tube.

When optical cells were employed, the light was directed horizontally through the optically flat window. The distance between the lamp and the window was 250 mm.

TABLE I

*Effect of irradiation upon antibacterial activity of pyridoxamine*

| | Pyridoxamine | | | Irradiation | | | | | Antibacterial Activity—Minimal concentration per ml. giving complete inhibition |
|---|---|---|---|---|---|---|---|---|---|
| Solution | Concentration | Diluent | pH | Filter # | Container | Volume (cc) | Duration | | |
| | | | | | | | Hr. | Min. | |
| | Percent | | | | | | | | |
| I | 1 | $H_2O$ | 2.1 | 4,441 | Py | 3 | 21 | 0 | 25 γ |
| II | 1 | $H_2O$ | 2.1 | 5,860 | Py | 3 | 21 | 0 | 6 γ |
| III | 1 | $H_2O$ | 2.1 | 5,970 | Py | 3 | 21 | 0 | 5 γ |
| IV | 1 | $H_2O$ | 2.1 | 9,863 | Py | 3 | 21 | 0 | 2 γ |
| V | 1 | V. B. | 2.1 | 5,970 | Py. Cell | 10 | 24 | 0 | 40 γ |
| VI | 1 | V. B. | 2.1 | 9,863 | Co. Cell | 10 | 24 | 0 | 6 γ |
| VII | 1 | V. B. | 2.1 | 9,863 | An. Co. Cell | 15.2 | 21 | 0 | 6.5γ |
| VIII | 1 | V. B. | 6.85 | 9,863 | Co. Cell | 10 | 21 | 0 | 125 γ |
| IX | 1 | V. B. | 2.1 | 9,863 | Co. Cell | 10 | 21 | 0 | 3 γ |
| X | 0.02 | V. B. | 2.1 | 9,863 | Py | 4 | 1 | 0 | 7 γ |
| XI | 0.02 | V. B. | 2.1 | 9,863 | Py | 4 | 2 | 0 | 3 γ |
| XII | 0.02 | V. B. | 2.1 | 9,863 | Py | 4 | 2 | 15 | 2 γ |
| XIII | 0.02 | V. B. | 2.1 | 9,863 | Py | 4 | 3 | 15 | 4 γ |
| XIV | 0.02 | V. B. | 2.1 | 9,863 | Py. 4° C | 4 | 2 | 15 | 25 γ |

V. B.—Veronal buffer. When the diluent was water, the adjustments were made with HCl.
Py.—Pyrex tube measuring 10 x 50 mm.
Py. Cell—Pyrex cells with optically flat window 1 mm. thick. Transmission of radiation below 320 mμ was negligible. The cells used had outside diameter of 22 mm.
Co. Cell—Optically flat Corex glass windows 1 mm. thick. The percentage of transmission in the ultraviolet and near-ultraviolet, as follows: 91%—above 360 mμ; 60%—at 293 mμ; 20%—at 275 mμ; and 2% at 255 mμ.
An. Co. Cell—Irradiation under anaerobic conditions in Corex cell, as above.
Py. 4° C.—Solution in Pyrex tube immersed in ice bath at 4° C. during irradiation.

The results with solutions I–IV of Table I were among those which were irradiated by directing the light into the open mouth of the Pyrex tube. Although stray light may have entered the solutions, it was suggestive that light in the visible region was not responsible for antibacterial activity. Thus, radiation through filter 4441 which transmitted only the visible light conferred considerably less potency (solution I) than radiation through filters 5860 and 9863 which transmitted ultraviolet light (solutions II and IV, respectively). Furthermore, comparison of the effect of filters 5860, 5970 and 9863 upon solutions II, III and IV, respectively, pointed to the fact that the greater the transmission in the region below 320 mμ, the more effective was the filter. The possible effect of stray light was eliminated in the following experiment with optical cells:

The transmission characteristics of the Pyrex cell and filter 5970 used for irradiation of solution V were such as to permit little radiation below 320 mμ. Conversely, solution VI in the Corex cell irradiated through filter 9863 received ultraviolet and near-ultraviolet radiation in the regions 255–410 mμ but little visible light. The antibacterial potency of solution VI proved approximately 6.6 times greater than that of solution V. It may be concluded, therefore, that the most effective radiation lies in the region below 320 mμ.

c. *Relation of H-ion concentration of solutions to the effect of irradiation.*—The H-ion determinations were made with the aid of Coleman and Beckman potentiometers. In early experiments, the desired pH of the solutions was obtained by adjustments with hydrochloric acid and sodium hydroxide. The results were more consistent, however, when concentrated water solutions of pyridoxamine were diluted with suitable veronal buffers.

As may be seen from Table I, little activity was obtained in solution VIII irradiated at pH 6.85, while solution IX acquired considerable potency following identical irradiation at pH 2.1. Additional experiments not recorded in the table were carried out with 0.02 per cent solutions of pyridoxamine at various pH. The results of the experiments under these conditions suggested strongly the existence of a critical relationship between the H-ion concentration of the solutions and the effect of irradiation. pH 2.05–2.1 appeared optimum. Some reduction in activity was noted at pH 3.0–6.0. A significant decrease in potency was found at pH 6.25. Solutions irradiated at pH 6.8, 7.2 and 8.2 showed slight or no activity.

d. *Optimum duration of irradiation.*—The effective duration of irradiation was related to the concentration of pyridoxamine. Markedly lower potency was obtained when a one per cent solution was exposed to ultraviolet radiation for periods shorter than sixteen hours. Twenty-one hours appeared optimum for the solution of this strength irradiated through filter 9863 at pH 2.1–2.5. Exposures longer than twenty-eight hours brought about deterioration of the potency acquired. With lower concentrations of the substance, brief periods of exposure proved effective. As may be noted from Table I, exposure for two hours and fifteen minutes was optimal for a 0.02 per cent solution (solution XII vs. solutions X and XI), deterioration beginning to appear in three hours (solution XIII).

e. *Relation of temperature of solutions to the effect of irradiation.*—All the irradiation experiments above described were carried out at room temperature. The potency of solution XIV held at 4° C. for the entire period of irradiation, was significantly lower than that of the control solution XI exposed at room temperature. The data, though incomplete, indicate that temperature is capable of influencing markedly the effect of irradiation. In view of the low temperature coefficient of photochemical reactions, the observation suggests that the resulting change may be a two-stage process, some additional thermal reaction occurring incidentally to the irradiation effect.

*f. Relation of molecular oxygen to the effect of irradiation.*—Solution VII was irradiated under anaerobic conditions. The Corex cell was filled to the neck with the solution boiled in a steam bath and sealed immediately with Vaseline. No gas bubbles were seen on hardening of Vaseline. Solution VI served as control. In order to obtain a large surface area, only 10 ml. of the solution were placed into the Corex cell. The solution was not boiled prior to the irradiation and there was no Vaseline seal. The two solutions were otherwise treated identically. Since there was observed little difference in the potency of the two solutions, it was concluded that antibacterial activity may be acquired in the absence of molecular oxygen. Thus it appeared that the activity was unrelated to possible formation of peroxides.

Preparations containing the antibacterially active product of my invention were tested in various known ways to determine whether the product contains peroxides and negative results were obtained. Thus the antibacterial action is not to be explained on this basis.

Spectrophotometric measurements of irradiated and non-irradiated solutions of pyridoxamine were made. Significant changes in the ultraviolet absorption of the irradiated pyridoxamine product as contrasted with the non-irradiated initial compound were observed. At pH 2.6 a marked fall in the extinction coefficient of the "acid" band was observed. The increased transparency in this region was accompanied by the appearance of significantly greater absorption at 248 m$\mu$. While a definite conclusion as to the exact position of the additional band is not justified on the basis of the experiments, inasmuch as no measurements were made at a shorter wave length, the band did not, however, seem to represent an end absorption since the latter is found at wave lengths shorter than 240 m$\mu$. At pH 6.87 there was a decrease in the extinction at approximately 325 m$\mu$ and little change in the absorption at 250 m$\mu$.

The several vitamin B$_6$ substances, pyridoxamine, pyridoxine and pyridoxal, were irradiated and following irradiation were tested for antibacterial potency against *E. coli* strain 42 in Gladstone medium. Pyridoxamine irradiated at pH 2.6 showed antibacterial activity, one unit being equivalent to 2.3 $\gamma$ of the substance per ml. of the medium. The remaining solutions possessed no antibacterial activity.

3. *Certain properties of R–Pm*

*a. Effect of heating.*—Preparations of pyridoxamine irradiated at pH 2.1 retained their original potency when heated at this pH at 56° C. and in the Arnold sterilizer at 90° C. for 20 minutes. They lost, however, completely this activity when the pH was adjusted to 7.0 prior to heating. Furthermore, the potency could not be restored on readjustment to pH 2.1 and repeated irradiation under suitable conditions.

*b. Effect of filtration.*—Preparations of pyridoxamine irradiated at pH 2.1 retained their potency upon filtration through a Mandler #8 filter. When the solutions were adjusted to pH 7.0 prior to filtration, all potency was lost following filtration through the Mandler filter.

4. *Antagonistic effect of amino acids upon R–Pm*

In preliminary experiments there was demonstrated an antagonistic effect of casein acid hydrolysate upon the antibacterial activity of R–Pm. The observation suggested the following investigation on the effect of individual amino acids.

A number of trial experiments indicated that the comparative study could be best made by serial titrations in which the concentration of the acids was 625 and the concentrations of R–Pm were 25, 12.5 and 6.25 per ml. With a few exceptions, at the concentration just mentioned, the amino acids were freely soluble in water and showed no antibacterial effect by themselves. The amounts of the preparation of R–Pm employed for the titrations were equivalent to 8, 4 and 2 antibacterial units, respectively. The use of a smaller number of antibacterial units seemed inadvisable in experiments on antagonistic effect of substances.

TABLE II

*Antagonistic effect of amino acids expressed in molar ratio of amino acids to R-Pm*

| Group I—50 per cent Antagonism | | Group II—5-20 per cent Antagonism | | Group III—No Antagonism | |
|---|---|---|---|---|---|
| Amino Acid Name | Molar Ratio | Amino Acid Name | Molar Ratio | Amino Acid Name | Molar Ratio |
| d-glutamic acid | 24.5:1 | dl-tryptophane | 90:1 | dl-threonine | 150:1 |
| glycine | 58:1 | l-arginine | 100:1 | dl-lysine | 180:1 |
| l-glutamic acid | 65:1 | l-tyrosine | 105:1 | dl-alanine | 220:1 |
| d-arginine | 100:1 | dl-methionine | 120:1 | B-alanine | 220:1 |
| l-hydroxyproline | 110:1 | dl-phenyl alanine | 135:1 | | |
| dl-isoleucine | 110:1 | dl-leucine | 140:1 | | |
| l-histidine | 120:1 | dl-valine | 155:1 | | |
| l-aspartic acid | 135:1 | | | | |
| l-asparagine | 135:1 | | | | |

As may be seen from Table II, the observed antagonism was expressed in terms of ratios of molar concentration of the amino acids to the highest molar concentration of R–Pm antagonized by the acids. The results were grouped on the basis of highest percentage of reversal which could be obtained with the amounts employed for the titrations. Obviously, the lower the ratios and the higher the percentage of reversal, the greater was the antagonistic property of the amino acids.

The results on the antagonistic effect of the acids of Group I were clear-cut and require no comment.

In Group II, low antagonism was convincingly shown only for phenylalanine, leucine and valine, since the molar ratios were as high as or higher than those of Group I. The question was undecided whether greater antagonism could be obtained with the remaining acids of Group II if higher concentrations were used. This was, however, not tested in view of the low solubility of tryptophane and tyrosine and the antibacterial effect shown by l-arginine in basal medium.

The lack of antagonistic effect of amino acids of Group III was clearly demonstrated, since the ratios employed were as high as or higher than those of Groups I and II. In addition to the acids recorded under Group III, d-lysine, dl-serine and l-cystine showed no antagonistic effect upon R-Pm when titrated in concentrations of 62.5 and 31.5 γ per ml. Higher concentrations could not be employed in view of their toxicity for *E. coli* in basal medium.

5. The effect of certain vitamins and related substances upon the activity of R-Pm The substances were tested for antagonistic effect upon two antibacterial units of R-Pm in following concentrations per ml. of basal medium: p-aminobenzoic acid, 50 γ; biotin (free acid), 12.5 m γ; folic acid, 1.25 γ; inositol 25 γ; nicotinic acid, 100 and 25 γ; nicotinamide, 100 and 25 γ; calcium pantothanate, 62.5 and 31.25 γ; pyridoxine, 62.25 and 12.5 γ; pyridoxal 62.25 and 12.5 γ; pyridoxamine, 62.25 and 12.5 γ; thiamin, 80 and 40 γ; and riboflavin, 12.5 and 3.1 γ. The substances showed no antagonistic effect upon the activity of R-Pm.

6. Antagonistic effect of substances of mixed composition upon R-Pm

The antagonistic effect of substances of mixed composition was determined in a two-fold manner, namely: (a) a given concentration of the substances was titrated against variable amounts of R-Pm, the smallest amount containing two antibacterial units was titrated against variable amounts of the substances. Fifty per cent of growth, as compared to the control culture, was taken as the "end-point." The results were accurate and reproducible and good correlation was obtained between the two series of titrations. The effect of the substances was recorded (Table III) in terms of nitrogen ratio of minimal antagonistic concentration of the substances to R-Pm.

TABLE III

*Antagonistic effect of substances of mixed composition*

| Substances Tested | | N $\frac{mg.}{ml.}$ | N Ratio of Substances to R-Pm Giving 50% Antagonism |
| --- | --- | --- | --- |
| Name | Preliminary Treatment | | |
| Casein, 10% | Acid Hydrolysis | 14.0 | 3.5:1 |
| Heart Infusion broth. | Autoclaved | 4.6 | 0.6:1 |
| γ-globulin, 2% | Mandler filtrate, 4° C. prolonged storage. | 2.9 | 106:1 |
| Human serum | Mandler filtrate, 4° C. storage 24 hours. | 10.2 | 72:1 |
| Do | Mandler filtrate, 56° C., 20 min. | 10.2 | 14:1 |
| Rabbit serum | Mandler filtrate, 4° C., 2 hours storage. | 10.1 | 69:1 |
| Do | Mandler filtrate, 56° C.—20 min. | 10.1 | 4:1 |
| Mouse serum | Mandler filtrate, 4° C.—24 hrs. storage. | 10.4 | 7.3:1 |
| Do | Mandler filtrate, 56° C.—20 min. | 10.4 | 3.3:1 |

The marked antagonism of casein acid hydrolysate is easily explained on the basis of the experiments described above, namely, the presence of antagonistic amino acids. For the time being, no explanation is offered for the comparatively greater antagonism of heart-infusion-broth since it may be caused by additional factors other than amino acids.

It is noteworthy that γ-globulin showed a rather weak antagonistic effect. This observation may be possibly explained by the fact that amino acids possessing low or no antagonistic effect, namely tyrosine, and serine and threonine, respectively, account for about 22.5 per cent of the weight of this protein.

The results of studies on sera seem to present two points of special interest:

There was a pronounced difference constantly and repeatedly observed in the antagonism of fresh and heated sera. Thus, the fresh rabbit, human and mouse sera were approximately 17.5, 5.1 and 2.2 times less antagonistic than the respective heated sera. The conclusion seemed justified that the sera contained in their fresh state a heat labile factor of variable concentration which was capable of reversing the antagonistic effect of sera upon R-Pm.

Comparison of the effect of heated sera demonstrated a difference in the concentration of the antagonistic substances seemingly related to species. Repeatedly, the mouse serum showed the greatest antagonism, while the rabbit serum was only slightly less antagonistic. In the single example studied, the human serum possessed the least antagonistic effect.

7. Characterization of antibacterial activity of R-Pm against E. coli, strain 42

*a. Effect of R-Pm upon the rate of growth and viability of organisms.*—A five-hour-old culture of *E. coli*, strain 42 in basal medium was suitably diluted in saline and added in concentration of $0.75 \times 10^6$ cells per ml. of basal medium containing 10, 2, 1 and 0.5 R-Pm units (viz., tubes 1, 2, 3 and 4, respectively). The control culture contained veronal buffer, pH 2.1 in the same volume (tube 5). The cultures were incubated for various periods of time and their optical density recorded. In order to determine the effect of the substance upon the viability of the organisms, the cultures were subcultured at frequent intervals of time on meat infusion broth, agar slants and agar plates. The plates were uniformly streaked with one loopful of the material, in order to obtain a rough comparative estimate of the number of viable organisms present. The results were as follows:

In the control culture (tube 5), visible growth appeared following incubation for five hours. The multiplication then proceeded at the normal rate giving an abundant growth after twenty-four hours of incubation. Tubes 1-3 had no growth, while tube 4 showed 50 per cent of the growth of the control culture after the same period of time. Following thirty-one hours of incubation, tubes 1 and 2 remained clear but tubes 3 and 4 had as much growth as the control tube. After fifty hours, tube 2 also showed growth. Tube 1 remained clear for the entire period of observation, lasting six days.

Subcultures made during the initial four hours of incubation demonstrated little or no reduction in the number of organisms inoculated. Following inoculation for five to seven hours, there was a definite decrease in the number of viable organisms in all tubes containing R-Pm. In tube 1, containing 10 R-Pm units, the bacterial concentration fell to approximately one-fourth of the control culture. Later subcultures demonstrated complete disappearance of organisms in tube 1, while viable bacteria persisted in the remaining cultures.

It may be concluded from the above experiments that the effect of R-Pm is both bactericidal and bacteriostatic, depending on the dose employed.

When 10 R-Pm units were used, there was observed a marked and progressive decrease in the number of viable cells beginning five to seven hours following incubation and bringing about complete sterilization of the culture. Since no bacterial counts were made, it remained yet unknown whether any multiplication preceded the decrease. With smaller concentrations, the effect was wholly bacteriostatic. One unit exerted complete bacteriostasis for twenty-four hours, 2 units gave complete inhibition of growth for a period over thirty-one hours, while one-half unit gave only incomplete bacteriostasis following twenty-four hours of incubation (50 per cent inhibition in this example).

b. *Effect of R-Pm upon "resting" cells.*—A saline suspension of a twenty-four hour old growth of *E. coli*, strain 42, on agar surfaces was washed twice by centrifuging in saline. The sediment was resuspended in veronal buffer pH 6.85 and centrifuged in order to obtain a well packed sediment. The sediment was resuspended in R-Pm solution, pH 4.0, containing 40 antibacterial units per ml, and in veronal buffer of the same pH. Aliquots of 0.15 cc. of packed sediment in 80 R-Pm units and 0.15 cc. of the sediment in veronal buffer were placed in the refrigerator at 4° C. for one-half hour and in water bath at 37° C. for one, three and one-half and six and three-quarters hours. The suspensions were then centrifuged until the supernates became perfectly clear and the sediments washed by centrifuging in veronal buffer pH 4.0. The supernatant solutions and the washings were tested for antibacterial activity and the sediments were cultured in meat infusion broth, on agar slants and on agar plates by streaking each plate uniformly with one loopful of the material. The results of the experiments were as follows:

c. *Absorption of R-Pm by bacterial cells.*—The bacterial cells failed to remove any R-Pm following storage at 4° C. for one-half hour. The supernatant solutions lost, however, about 50 and 75 per cent of activity by incubation with the cells at 37° C. for one and three and one-half hours, respectively. There occurred complete loss of potency after incubation for six and three-quarter hours. No active material was recovered in the washings of the cells.

d. *Viability of "resting" cells exposed to R-Pm.*—The viability of cells exposed to R-Pm at 4° C. for one-half hour was not tested. The effect of R-Pm upon the cells at 37° C. was clear-cut. The cells were viable following incubation for one and three and one-half hours. All cells were dead after contact with the substance for six and three-quarter hours. The viability of the cells was preserved in the control suspension following the same incubation period.

3. *Antibacterial activity of R-Pm against microorganisms other than E. coli, strain 42*

The tests were made in the Gladstone basal medium against microorganisms which grew abundantly in this medium. The remaining bacteria were tested in enriched media. The results are summarized in Table IV.

TABLE IV

*Susceptibility of microorganisms to R-Pm*

| Microorganisms | Medium used in test | No. of bacterial cells/ml. at zero hours | R-Pm units giving complete inhibition |
|---|---|---|---|
| *E. coli*, strain 42 | Gladstone basal medium. | $0.75 \times 10^6$ | 1 |
| *E. coli*, strain 560 | ----do---- | $0.75 \times 10^4$ | 3 |
| *E. coli*, strain 456-1 | ----do---- | $0.75 \times 10^4$ | 3 |
| *B. Friedlanderi*, type A. | ----do---- | $0.75 \times 10^4$ | 4 |
| *B. Friedlanderi*, type B. | ----do---- | $0.75 \times 10^4$ | 5 |
| *B. Friedlanderi* (type unknown) strain 981. | ----do---- | $0.75 \times 10^4$ | 5 |
| Group B: *S. typhi murium*, var. Binns. | ----do---- | $0.75 \times 10^6$ | 3.2 |
| Do | ----do---- | $0.75 \times 10^4$ | 2 |
| Group B: *S. Paratyphi B* | Gladstone basal medium and serum dil. 1:40. | $0.75 \times 10^6$ | 25 |
| Group D: *S. typhi*, strain $T_{LM}$. | Fildes Synthetic medium. | $0.75 \times 10^4$ | 1.25 |
| Group D: *S. panama* | Gladstone basal medium. | $0.75 \times 10^4$ | 2 |
| *Sh. Flexner* | Meat infusion broth. | $0.75 \times 10^6$ | 50 |
| *Sh. Shiga* | ----do---- | $0.75 \times 10^6$ | 20 |
| *Staph. H* | ----do---- | $0.75 \times 10^6$ | 40 |
| Do | Meat infusion broth diluted 1:2 with saline. | $8 \times 10^2$ | 20 |
| *Strep. βhemol.* Lancefield A strain J19. | Meat infusion broth and serum dil. 1:40. | $8 \times 10^2$ | 65 |

As may be seen from Table IV, R-Pm exerted a potent antibacterial effect upon a variety of microorganisms. Gram positive organisms showed a greater resistance to R-Pm than the Gram negative ones. This fact was possibly at least in part due to the required use of enriched media which, as shown in preceding experiments, were capable of antagonizing the antibacterial effect. The susceptibility of Gram negative organisms varied widely. The marked effect of the substance upon organisms quite refractory to other antibiotics is of special interest. It is also noteworthy that the $T_{LM}$ strain of *B. typhosus* tested in Fildes et al. complete synthetic medium (Brit. J. Exp. Path. 17:481 (1936), showed a susceptibility nearly as high as that of *E. coli*, strain 42 in basal medium. Apparently, the inherent susceptibility of the organism was considerable since the Fildes medium was significantly antagonistic to R-Pm.

It was also noted in a number of experiments not recorded in this paper that the smaller the inoculum, the greater was the activity of R-Pm. An experiment with *S. typhi murium*, var. Binns is given in Table IV in order to illustrate this relationship.

In the light of my investigations, the results of which are in part set forth above, the process of preparing the new antibacterial product may be summarized as including the following essential conditions:

1. The preliminary acidification of an aqueous solution of pyridoxamine or the hydrochloride salt to a pH of less than 6.25 and preferably to a pH of 3 or lower. Optimum results under the conditions recited have been obtained at a pH of 2.01–2.1.

Irradiation with ultraviolet light preferably with exclusion of visible light. For optimum results filters assuring transmission of a large proportion of radiations of a wave length of below 320 mμ are recommended.

2. Regulation of the duration of the irradiation treatment is important as affecting the potency of the product, varying inversely with the concentration of the solution and the intensity of the irradiation treatment as well as with respect to the degree of acidity of the solution. In other words, the greater the dilution of the solution the shorter the duration of the treatment required to attain a given degree of potency of the product, other conditions remaining the same. Likewise the greater the degree of acidity the shorter the duration of the treatment required to produce a given antibacterial potency in the irradiated product. Unduly prolonged irradiation is to be avoided since it will produce a retrogression of the potency, which indicates that the irradiated product will undergo further transformation if the irradiation treatment is continued indefinitely.

It is believed that the antibacterial action of the irradiated product is due to the presence therein of a lactam ring linked to the pyridine nucleus in a chelate grouping relationship. While I do not intend to be irrevocably bound to the theory here advanced, it is also believed that the reactions involved in the conversion of pyridoxamine into the antibacterial product proceed as follows:

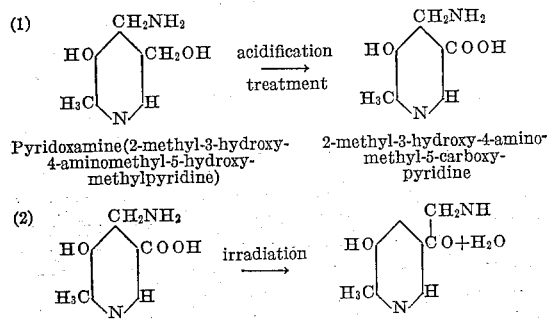

Pyridoxamine (2-methyl-3-hydroxy-4-aminomethyl-5-hydroxymethylpyridine)     2-methyl-3-hydroxy-4-aminomethyl-5-carboxypyridine The formation of the desired end product containing the lactam ring attached to the pyridine nucleus, may, of course, be achieved by chemical means as distinguished from the use of ultraviolet radiations or other means tending to disturb the normal resonance of the ring and thereby bringing about an electronic shift with closing of the lactam ring. In certain of its aspects, therefore, my invention is to be deemed as including the antibacterial product per se without regard to the method of its production.

Where herein reference has been made to the acidification of solutions of the initial pyridoxamine, it is to be understood that any suitable acid may be used which will bring about the desired acidification and either directly effects the conversion of the pyridoxamine to 2-methyl-3-hydroxy-4-aminomethyl-5-carboxypyridine or will condition the pyridoxamine for such transformation as a consequence of the irradiation treatment.

It will also be understood that the procedures herein described for carrying on the irradiation are set forth by way of specific example and not by way of limitation. For example, I have successfully used ultraviolet radiations of much greater intensity than those obtainable with the type of lamp specifically mentioned and have produced the anticipated results with the duration of the treatment correspondingly shortened. Various other changes in the details of the procedures, in the selection of the filters used in controlling the quantity and wave length range of the ultraviolet radiations applied, and in the nature and composition of the liquid medium used as the suspending medium for the pyridoxamine, may be made without departing from the invention which is not to be deemed as limited otherwise than as indicated by the language of the appended claims.

I claim:

1. The process of preparing a product exhibiting antibacterial activity toward both Gram positive and Gram negative bacteria which comprises acidifying a solution of pyridoxamine to a pH of less than 6.25 and thereafter irradiating the solution with ultraviolet light for a period of from 1 to 28 hours while excluding substantially all visible light.

2. The process of preparing a product exhibiting antibacterial activity toward both Gram positive and Gram negative bacteria which comprises acidifying an aqueous solution of pyridoxamine to a pH of less than 3 and thereafter irradiating the solution for a period of from 1 to 28 hours with light of wave lengths at least largely confined to the ultraviolet wave length range below 320 m$\mu$ while excluding substantially all visible light.

3. The process of preparing a product exhibiting antibacterial activity toward both Gram positive and Gram negative bacteria which comprises acidifying a dilute solution of pyridoxamine to a pH of between 2.01 and 3 and thereafter irradiating the solution with ultraviolet light largely confined to the wave length range below 320 m$\mu$ for a period of from 1 to 28 hours while excluding substantially all visible light.

4. The process of preparing a product exhibiting antibacterial activity toward both Gram positive and Gram negative bacteria which comprises acidifying a solution of pyridoxamine to a pH of 2.01–2.1 and thereafter irradiating the solution with ultraviolet light largely confined to the wave length range below 320 m$\mu$ for a period of from 1 to 28 hours while excluding substantially all visible light.

5. The process of preparing a product exhibiting antibacterial activity toward both Gram positive and Gram negative bacteria which comprises irradiating 2-methyl-3-hydroxy-4-aminomethyl-5-carboxypyridine while said compound is dissolved in an aqueous solution acidified to a pH of less than 6.25 with light waves at least largely confined to that part of the ultraviolet wave length range below 320 m$\mu$ for a period of from 1 to 28 hours while excluding substantially all visible light.

GREGORY SHWARTZMAN.

REFERENCES CITED

The following references are of record in the file of this patent:

UNITED STATES PATENTS

| Number | Name | Date |
| --- | --- | --- |
| 1,873,942 | Windams | Aug. 23, 1932 |
| 2,247,266 | Wibaut et al. | June 24, 1941 |
| 2,349,318 | Westphal | May 23, 1944 |
| 2,372,588 | Larsen et al. | Mar. 27, 1945 |
| 2,417,541 | Carlson | Mar. 18, 1947 |
| 2,422,619 | Harris | June 17, 1947 |

OTHER REFERENCES

Shwartzman et al., Journal Biological Chemistry, vol. 167 (Feb. 1947), pp. 345–362.

Ellis et al., Chemical Action of Ultraviolet Rays, 1941, pp. 518–522.